United States Patent [19]

Watanabe

[11] Patent Number: 4,916,744
[45] Date of Patent: Apr. 10, 1990

[54] IMAGE SIGNAL PROCESSING METHOD

[75] Inventor: Ryoichi Watanabe, Kanagawa, Japan

[73] Assignee: Fuji Photo Film Co., Ltd., Kanagawa, Japan

[21] Appl. No.: 195,405

[22] Filed: May 16, 1988

Related U.S. Application Data

[63] Continuation of Ser. No. 939,975, Dec. 10, 1986, abandoned.

[30] Foreign Application Priority Data

Dec. 10, 1985 [JP] Japan .................................. 60-277407
Dec. 10, 1985 [JP] Japan .................................. 60-277408

[51] Int. Cl.$^4$ ................................................ G06K 9/38
[52] U.S. Cl. ........................................ 382/53; 358/464
[58] Field of Search ............................ 358/282; 382/53

[56] References Cited

U.S. PATENT DOCUMENTS

| | | | |
|---|---|---|---|
| 3,599,148 | 8/1971 | Stern | 382/53 |
| 3,869,698 | 3/1975 | Trost et al. | 382/53 |
| 4,064,484 | 12/1977 | Mesa et al. | 382/53 |
| 4,525,747 | 6/1985 | Sakai et al. | 382/53 |
| 4,547,811 | 10/1985 | Ochi et al. | 358/280 |
| 4,649,436 | 3/1987 | Nakagawa et al. | 358/282 |
| 4,741,046 | 4/1988 | Matsunawa et al. | 382/51 |
| 4,742,399 | 5/1988 | Kitamura | 358/282 |

Primary Examiner—Leo H. Boudreau
Attorney, Agent, or Firm—Sughrue, Mion, Zinn, Macpeak & Seas

[57] ABSTRACT

A signal processing method and apparatus for measuring the background level of an image by detecting a minimum or maximum value of a smoothed image signal. The background level is used to set an optimum threshold for binary digitization.

2 Claims, 16 Drawing Sheets

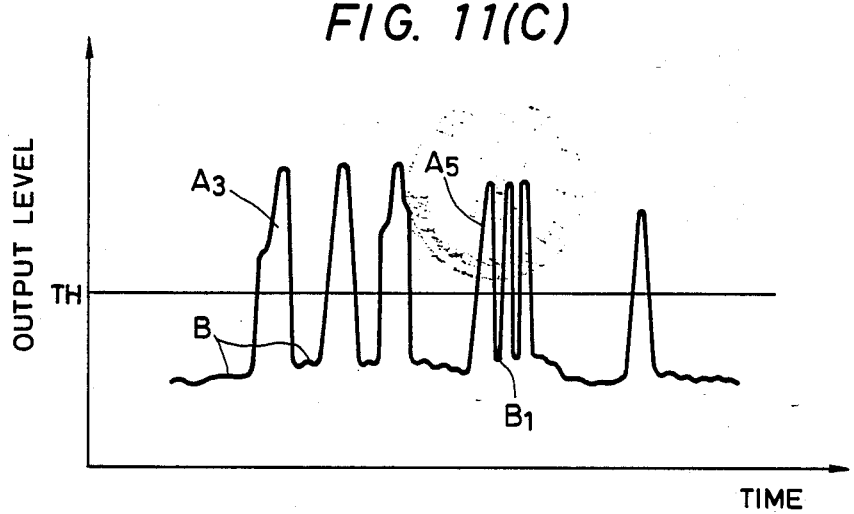
FIG. 11(B)
FIG. 11(C)
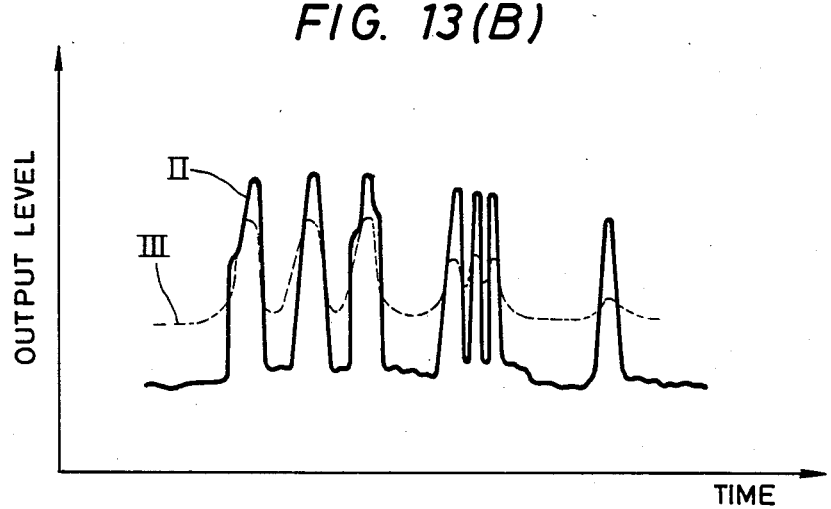
FIG. 13(B)

IMAGE SIGNAL PROCESSING METHOD

This is a continuation of application Ser. No. 939,975, filed 12/10/86, now abandoned.

BACKGROUND OF THE INVENTION

Field of the Invention

This invention relates generally to an image signal processing method. More particularly, the invention relates to such a method for measuring background density of image data and setting an optimum threshold value for processing image data through binary digitization on the basis of the background density being measured.

Background of the Invention

Various devices and systems such as image readers, copying machines and fascimiles have heretofore been devised. Furthermore a microfilm reader for use as an image processing system has also been developed recently.

Microfilm Reader

Prior to describing the present invention, a description will be given of the microfilm reader as an image processing system.

With an increase in the quantity of information, the number of papers with various pieces of information has increased by leaps and bounds. As a result, special emphasis has been laid on the introduction of a system for storing a number of papers in a minimum space and making them retrievable. In order to meet such a demand, bits of information recorded on paper must be first condensed and recorded on certain means for preserving purposes. Microfilm and optical disks are now in use as the recording means. The microfilm for storing two-dimensional data is advantageous in that it can be preserved for a long period of time, produced in court for use as evidence, copied a number of times as one and the same source of information and so on. On the other hand, the optical disk can record a great deal of data, add and renew the data on a real time basis in a digital form. Its advantage is that the data thus recorded can be interfaced with a computer and utilized as it is for transmission.

In order to make the best use of their advantages, it has been proposed that originals such as papers are successively and collectively photographed onto microfilm, together with retrieval data for retrieving data carried thereon. This microfilmed data is recorded on an optical disk. The original data recorded on the optical disk together with the retrieval data may be read and printed out or used by anyone to prepare another microfilm anytime. It can also be directly transmitted to a remote location through a facsimile. In consequence, a high degree of data utilization becomes possible.

FIGS. 1 through 3 are block diagrams showing a microfilm reader for use as an image processing system for writing data from originals to an optical disk.

Referring to FIG. 1, the microfilm reader will be outlined.

The microfilm reader is designed to first record original image data such as characters, graphs and digital data recorded in a computer memory as microfilm data and to read only the desired data out of the microfilm data using its microfilm scanner to file it onto an optical disk.

As shown in FIG. 1, the original image data contained on papers 10 are taken by a microfilm camera 20 (simply called the "camera" hereinafter) onto a microfilm and subjected to ordinary development 30 to prepare a microfilm 40. The microfilm 40 may be a 16 mm rolled microfilm 42, 35 mm rolled microfilm 44, microfiche film 46 or aperture film 48.

Subsequently, the image data stored on the microfilm 40 is read out by a microfilm scanner 100 and converted into digital image data PS, which together with control data for controlling the order wherein the images have been taken is sent to an optical disk recorder 200 wherein the image data PS, together with the control data, are stored in an optical disk 50. When the data PS is read out, a special kit 102 is loaded with the microfilm 40 in position and the microfilm 40 is scanned with an image sensor 104. Moreover, the image is projected on a screen 106, if necessary, and, while being viewed, converted into a digital form. When the image data PS is recorded on the optical disk 50 in the optical disk recorder 200, the image data PS supplied thereto by a scanner 202 is read out and displayed by a CRT display unit 204. While the image data thus displayed is viewed, index data indicative of the contents and kinds thereof is input using a keyboard 206 to write the data to the optical disk 50. The index data may be supplied using the keyboard 206 while the image projected on the screen 106 of the microfilm scanner 100. The input work of this kind is normally carried out by one operator with a processing capacity of about 3,000 pages per 8 hours. A personal computer system 60 may be provided to increase the speed of the input work. In this case, a plurality of personal computers, e.g., two of them 62 and 64 may be installed. That is, one personal computer 62 is used to feed index data through a keyboard 62a for data displayed on the screen 106 of the microfilm scanner 100, whereas the other personal computer 64 is used to supply index data by means of a keyboard 22a while the screen 106 of another special microfilm reader 100a is viewed. As a result, both floppy disks 66 and 68 are stored with the data. A floppy disk device 70 of the optical disk recorder 200 is loaded with the floppy disks 66 and 68 to read the data and write the index data corresponding to the image data stored in the optical disk 50.

Another possible arrangement is to make it possible that the index data prepared by the personal computer 62 and 64 can be inputted to the microfilm scanner 100, whereby the index data, together with the image and control data, are transferable to the optical disk recorder 200 by providing the microfilm scanner 100 with the retrieving function.

Description of Microfilm Scanner

Referring to FIG. 2 an example of the construction of the microfilm scanner 100 will be described.

The microfilm scanner 100 roughly consists of an optical reader 120 for reading image data on a microfilm, a driving section 140 of the optical reader 120, a signal processor 160 for supplying the signal form the optical reader 120 to an optical device recorder 200 and a controller 180 for controlling the driver 140 and the signal processor 160.

The optical reader 120 is equipped with an illuminating system 122 having a light source 1222 and condenser lenses 1224. An image projecting system 126 has a microfilm holder 124 for holding the microfilm 40 with pressure glasses 1242a and 1242b for preventing an image from distorting, a projection lens 1262, focusing lenses 1264, 1266, a half-mirror 1268 and a screen 106. Supply and winding reels 128a and 128b supply the microfilm 40 to the illuminating passage. A mark sensor 130 optically detects blip marks attached to the microfilm 40 or the difference in density between the frames. A sensor 132 detects the density data of the microfilm for image-reading under optimum conditions, i.e., automatic exposure control. A sensor section 134 uses an image sensor 104 to scan the optical image data subjected to beam splitting and projected through the half-mirror 1268 and converts the data into an electric signal. In this case, the focusing lenses 1264 and 1266 may be omitted, provided there is used an image sensor 104 capable of reading an image of original size prior to being compacted to a micro-image, i.e., reading the enlarged image as it is.

The driving section 140 is equipped with a drive controller 142 for driving the supply and winding reels 128a and 128b according to the signal from the mark sensor 130 to convey the microfilm 40 on a frame basis. A driving circuit 150 controls a motor 148 for driving a screw-nut mechanism mechanically coupled to the transverse direction of the image sensor 104. The image sensor 104 can scan the transmitted light as the motor 148 rotates.

The signal processor 160 is equipped with a drive reading circuit 162, a line density switching circuit 164 and an RS422 data port 166. The drive reading circuit 162 moves the image sensor 104 for focusing purposes based on the film density data obtained by the sensor 132 so that the image-reading can be carried out under optimum conditions. The drive reading circuit 162 sends the image data detected by the image sensor 104 and subjected to photoelectric conversion to the line density switching circuit 164. The line density switching circuit 164 sends out the image data at a given suitable density of 16 or 8 limes/mm to the optical disk recorder 200 through the data line 166.

The controller 180 is designed to control the driving section 140 and the signal processor 160 and is equipped with a central processor unit (CPU) 182, and RS232 data port 184 for causing data CS such as control image data and the like to be exchanged between the CPU 182 and the optical disk device 200, and a personal computer 186 for transmitting a command to the CPU 182 through the data port 184. The controller 180 is further so arranged as to control the drive controller 144 and the driving circuit 150 through an interface 142 according to the instructions from a keyboard 143. In this way also, another command is given from the keyboard 143 to the CPU 182.

Optical Disk Recorder

The optical disk recorder 200 will subsequently be described, of which FIG. 3 is a block diagram.

The recorder 200 is equipped with an CPU 210, a ROM 212, a RAM 214, a CRT 216, a keyboard 218 and an interface 220 which are connected to a bus 222 common to them. The interface 220 is connected to the floppy disk device 70 or a host CPU 224. To the host CPU 224 is connected, through a bus 226, a graphic processor 228, a scanner 202 and the microfilm scanner 100. Those elements are provided with a controller 240 for controlling writing and reading data to and from the floppy disk 50 and a driving section 260 for the floppy disk 50 through an interface 230 and a bus 232.

The writing and reading controller 240 controls writing image data and reading the image data thus filed in its disk data controller 242. The writing of the data is carried out by generating a laser beam LB from a laser driver 246 through a modulator 244 according to the image, control and index data read out of the scanner 202.

The reading of the data from the optical disk 50 is carried out by a photo cell 250 coupled to a reading head 248. The data optically picked up in the photo cell 250 is passed through a cell processor 252 and then demodulated by a demodulator 254. In this case, the position of the head 248 is focused to the surface of the optical disk 50 by means of a focusing mechanism 256 to read accurate data out of the cell 250.

On the other hand, the driving section 260 is divided into sector and cross field control systems. The sector control system is controlled by a sector controller 262, whereas the cross field control system is controlled by a cross feed controller 272. The sector controller 262 controls a spindle motor 266 through a driver 264 and its actual position is detected by a sector wheel 268 and a sector pulse counter 270 so as to set it to the sector command position by feeding back the data detected by the sector controller 262.

The cross feed controller 272 controls a linear motor 276 through a driver 274 and its controlled position is detected by moire stripes 278 and a grating device 280, its position being set to the cross feed commanding position by feeding back the data detected to the cross feed control means 272.

The use of the microfilm reader heretofore proposed makes it possible to store not only the existing data stored on a microfilm but also additional data that has not been converted into the above form of a microfilm. The additional data can include data available in the future that is fit for being filed in an optical disk. It is thus possible to retrieve all the data thus stored and to utilize it on an on-line basis.

In the above microfilm reader, as shown in FIG. 4, an image (forming a picture element matrix) is projected onto the microfilm 40 and is formed on the exposure stand 1342 of the micro-reader with illuminating light from the light source 1222. This projected image is read by the one-dimensional image sensor 104 used to scan in the main scanning direction (X) of the sensor array direction and in the auxiliary direction (Y) of the mechanical sensor driving direction. The reading also makes available image data (image signal) from the sensor 104 on a picture element basis in a time-serial form, the image data being thus digitized in binary form and outputted for second-stage processing.

In digitizing the image signal, the threshold level must be determined for the binary digitization of the image signal. When a conventional method for setting up the threshold level is applied to the microfilm reader, the film density is detected by measuring the mean value of the light of an image projected separately from the image which is scanned to obtain the image signal. The threshold level is thus determined from the density obtained from the mean light measurement.

In the case of the mean light measurement, however, it is executed by approximately measuring the density distribution over a somewhat wide range of picture plane, e.g., one-quarter of the total projected image. If there is a portion that slips out of the light measuring range, i.e. is effectively transparent, the density thus measured is apt to incline toward the value in the transparent portion and does not always reflect an accurate film density.

Provided the conventional means light measurement is applied, the problem is that an accurate threshold level for binarization (binary digitization) cannot be obtained.

Although there is a method for manually setting the threshold level, it can never be adjustable to a proper value because the background of some film fluctuates by a large margin.

In addition, when an amount of light suitable for reading image data on the microfilm or other kind of films is manually set, test photographing needs to be carried out for several times. However, a slight fluctuation in the amount of light from the suitable value causes the reproduced image data to become black on the whole surface. For this reason, adjustment of the amount of light has actually been very delicate and difficult.

SUMMARY OF THE INVENTION

An object of the present invention is therefore to provide an image processing method for accurately, properly and automatically digitizing image data obtained by reading an image with an image sensor.

In order to accomplish the above object, the background density is obtained from the electrical image signals which are to be binary digitized, an extremum value of the electrical signals is obtained which is related to a background level of the image, and a threshold value is obtained from the extremum value. The threshold value is used for binary digitization of the image signals.

A first version of an image signal processing method of the present invention includes the procedure of properly setting a threshold value for use in binary digitizing image data. This threshold setting procedure comprises smoothing the output of the image data obtained by scanning the negative film of an image being projected and read, obtaining a minimum value from the output distribution obtained by the smoothing, and obtaining the background density of the image data from the minimum value to set an optimum threshold value through digitization corresponding to the background density.

While the present invention is executed, the optimum value for binary digitization is prestored in a table memory by relating the optimum value to a background density value and an optimum threshold value should preferably be read out depending on the background density value.

According to a second version of an image signal reading method of the present invention, the method for setting an optimum threshold value for the binary digitization of image data comprises obtaining a maximum value of the output of image data from the output distribution thereof obtained by scanning the positive film of an image being projected and read with an image sensor, and obtaining the background density of the image data for setting a threshold value from the maximum value to set the optimum threshold value for binary digitization depending on the background density.

While this version of the present invention is executed, the optimum value for binary digitization is prestored in a table memory by relating the optimum value to the background density value and the optimum threshold value should preferably be read depending on the background density value.

Since the minimum or maximum value of the output of the image data read out of the image sensor is set as the background density according to the present invention, the background density can be measured accurately and quickly and a proper digitization threshold value can properly be set on the basis of the background density. Further, automatic exposure of the film can be carried out on the basis of the data of the background density being measured.

BRIEF DESCRIPTION OF THE DRAWINGS

FIGS. 11(A)–11(C) are diagrams explanatory of a first digitization method of FIG. 10(A).

DETAILED DESCRIPTION OF THE INVENTION

Referring to the acompanying drawings, a description will be given of an embodiment of the present invention in the form of an image processing method applied to a microfilm scanner shown in FIG. 2 for measuring the background density of image data. Although the following refers to mainly a negative film, the present invention is obviously applicable to a positive one.

Figure 2:
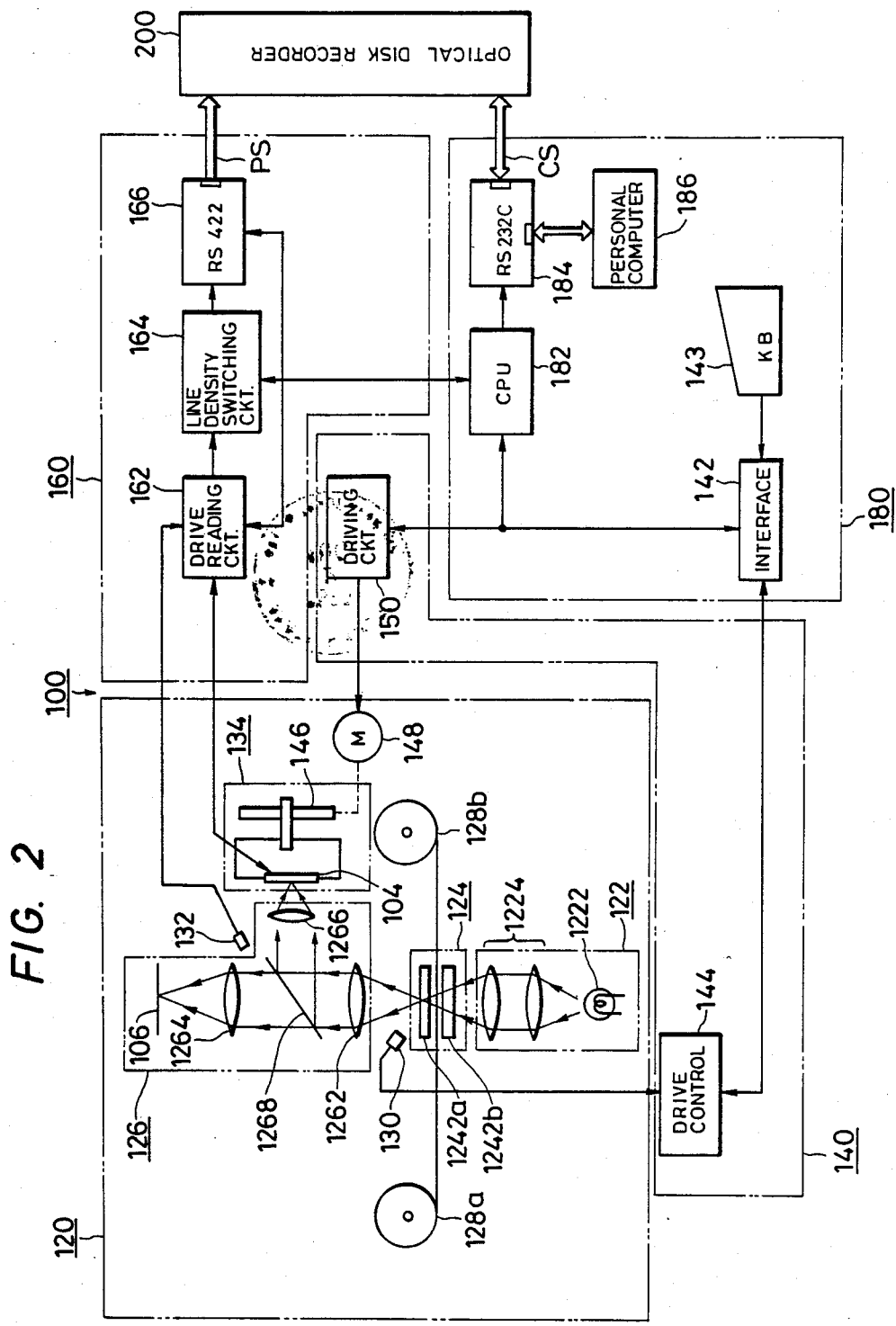
FIG. 2 is a diagram explanatory of a microfilm scanner as part of FIG. 1.
Figure 5:
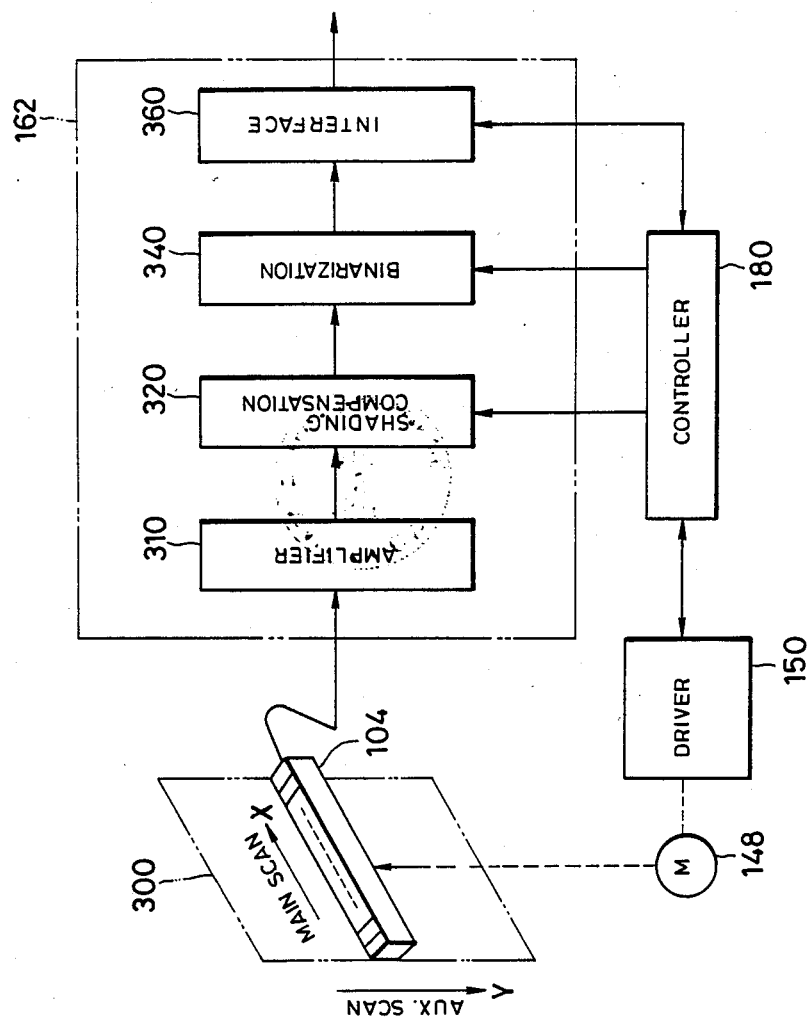
FIG. 5 is a block diagram illustrating an image signal processing method according to the present invention.

FIG. 5 is a block diagram of an apparatus and circuit applicable to the present invention, wherein there is shown a portion of FIG. 2 corresponding to a sensor section 104, the drive reading circuit 162, the driving circuit 150, a motor 148 and the controller 180.

In FIG. 5, an image 300 projected onto a microfilm is electrically scanned in the main scanning direction X and mechanically scanned in the auxiliary scanning direction Y with the one-dimensional image sensor 104. The time serial picture data read by the sensor 104 on a picture element basis is sent to a shading compensation circuit 320 through an amplifier 310. In the shading compensation circuit 320, and embodiment of which is described later, the image data is subjected to two-dimensional shading correction to improve the image quality of the reproduced image. The image data thus shading corrected is converted by a binary digitization circuit 340 into a binary value before being supplied to other processing circuits including the line density switching circuit 164 of FIG. 2 in the second stage through an interface circuit 360. Although the two-dimensional shading correction can be carried out through the method disclosed in a previous application by the present inventors, its description will be omitted at this point since it is irrelevant to the gist of the present invention and is not necessary.

The image data obtained from the shading correction in the shading correction circuit 320 according to the present invention is submitted to various image signal processes to digitize the data in the binary digitization circuit 340. There are, needless to say, various methods for binary digitization as is obvious from the following description in which an image signal process for binary digitization of a negative film will be described.

Figure 6:
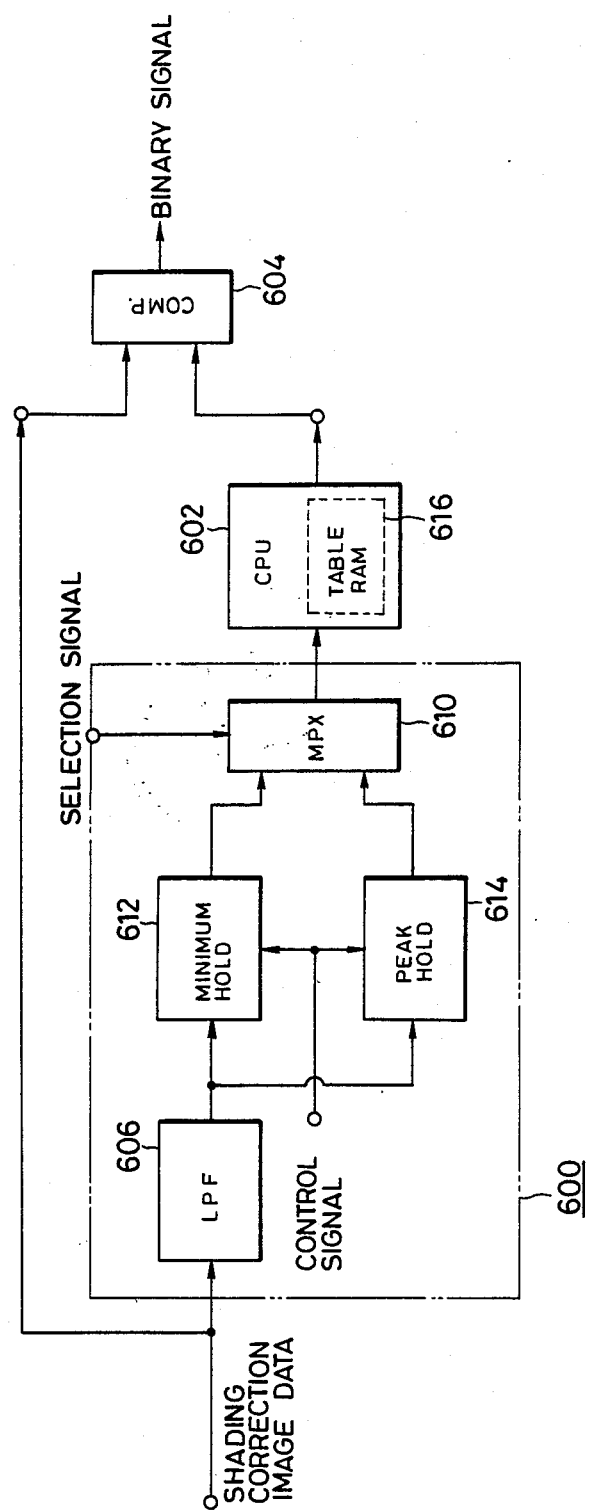
FIG. 6 is a block diagram showing a circuit for mainly measuring the film density and setting the threshold level for illustrating an example of the binary circuit.

Measurement of Film Density and Setting Up of Threshold Value for Binary Digitization 1. Density Measurement FIG. 6 shows an example of the binary digitization method, according to which the film density is detected from the shading correction image data and a fixed threshold level is set in accordance with the film density, so that the binary digitization is effected by comparing the image data with the threshold level. A description will be given of the above case.

The film density must be determined in order to prevent the film background from affecting the threshold value being set for binary digitization.

Since the conventional mean light measurement is applied to the image projected as set forth above, the mean density value instantly tends to shift close to that of a transparent region, provided the image has the transparent region over a wide area. In consequence, most of the portion bearing data such as characters blanks out and will not reflect the original data accurately. The reason for this is that the mean light measurement covers a square area as wide as 5 cm.

On the other hand, the image sensor 104 is capable of reading data in an extremely small area on a square of ⅛ mm on a side within the projected image. The image sensor 104 outputs image data. If the film density measurement is made on the output of the obtained image data, a more faithful density than that obtained from the mean light measurement becomes available.

Consequently, the density measurement is made using the output of the image data subjected to correction such as shading correction by means of the image sensor 104. Since the relation between the intensity of output of the image data and the density is in a one-to-one relationship, the intensity of the output thereof may be called simply the density.

Figure 7A:
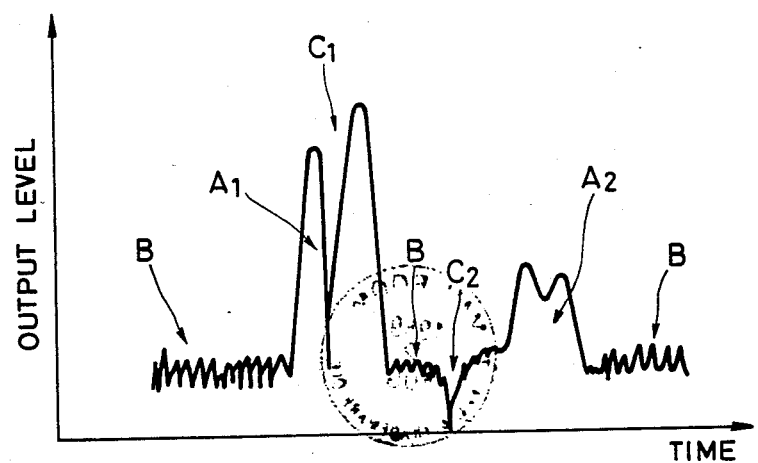
FIGS. 7(A) and 7(B) are signal waveform charts explanatory of the present invention.

The image data subjected to the correction is plotted on an output distribution curve of FIG. 7(A) with time as the horizontal axis and the output level as the vertical axis. This distribution is composed of portions $A_1$ and $A_2$ covering data where the light passes therethrough and a background B. However, if the image data thus corrected has dust or a scratch, there are left parts of the above portions as shown by $C_1$ and $C_2$ where the light is not allowed to pass therethrough and the output (corresponding to the density) has sharply dropped. Moreover, noise in the background has not completely been removed, whereby the portion involved remains extremely noisy. As a result, the density level of the background must be made clear to set a threshold level free from noise attributed to the dust or scratch.

Figure 7B:
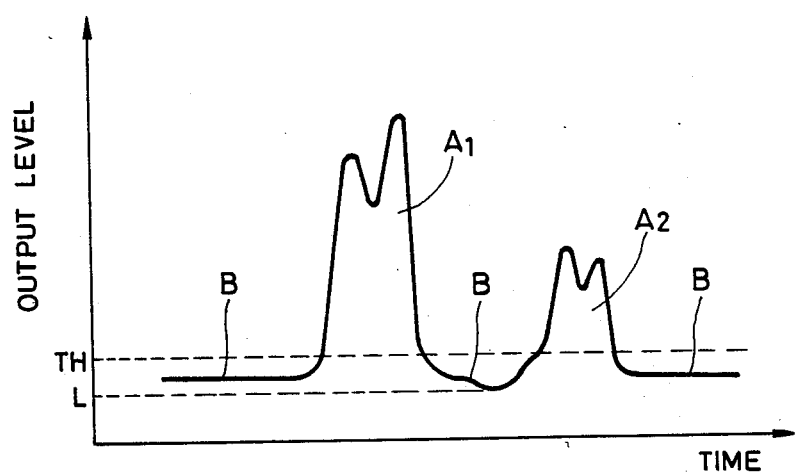

Accordingly, if the dust or scratch contained in the image data and other noise components in the background are smoothed by a low-pass filter (LPF), as shown in FIG. 7(B), to determine the minimum level of the output from the output distribution of the image data thus smoothed, the density corresponding to the minimum value may be determined and a threshold level usable for the density can be set. Then a threshold level for binary digitization, which is faithful to the original image data can also be set. In the case of a positive film, a corresponding density is obtainable when the maximum value (peak level) of the output is measured.

FIG. 6 is a block diagram showing an example of the image processor illustrating a method for determining the threshold level by measuring the above-described film density and binary digitizing the image data according to the threshold level. In FIG. 6, there is shown an arrangement of a film density measuring circuit 600 for measuring the output of the image data, a central processing unit (CPU) 602 for setting a threshold value for binary digitization and a comparator 604 for binary digitization. The CPU 602 may also be used as the CPU 182 of the controller 180. The film density measuring means 600 is equipped with a low-pass filter 606 and a multiplexer (MPX) 610.

The operation will now be described. Assuming digital data equivalent to one line having the output (density) distribution shown in FIG. 7(A) is supplied to the low-pass filter 606, it is smoothed and produced as image data having the output distribution of FIG. 7(B) with time as the horizontal axis and the output level as the vertical axis.

In the above image data, dust or a scratch and the noise components of the background have been smoothed. The minimum value L of the image data is searched and then held in a minimum holding circuit 612. The multiplexer 610 is switched using a selective signal from the CPU 182 of the controller 180 shown in FIG. 2 to send the minimum value L to the CPU 602 in the next stage.

Figure 3:
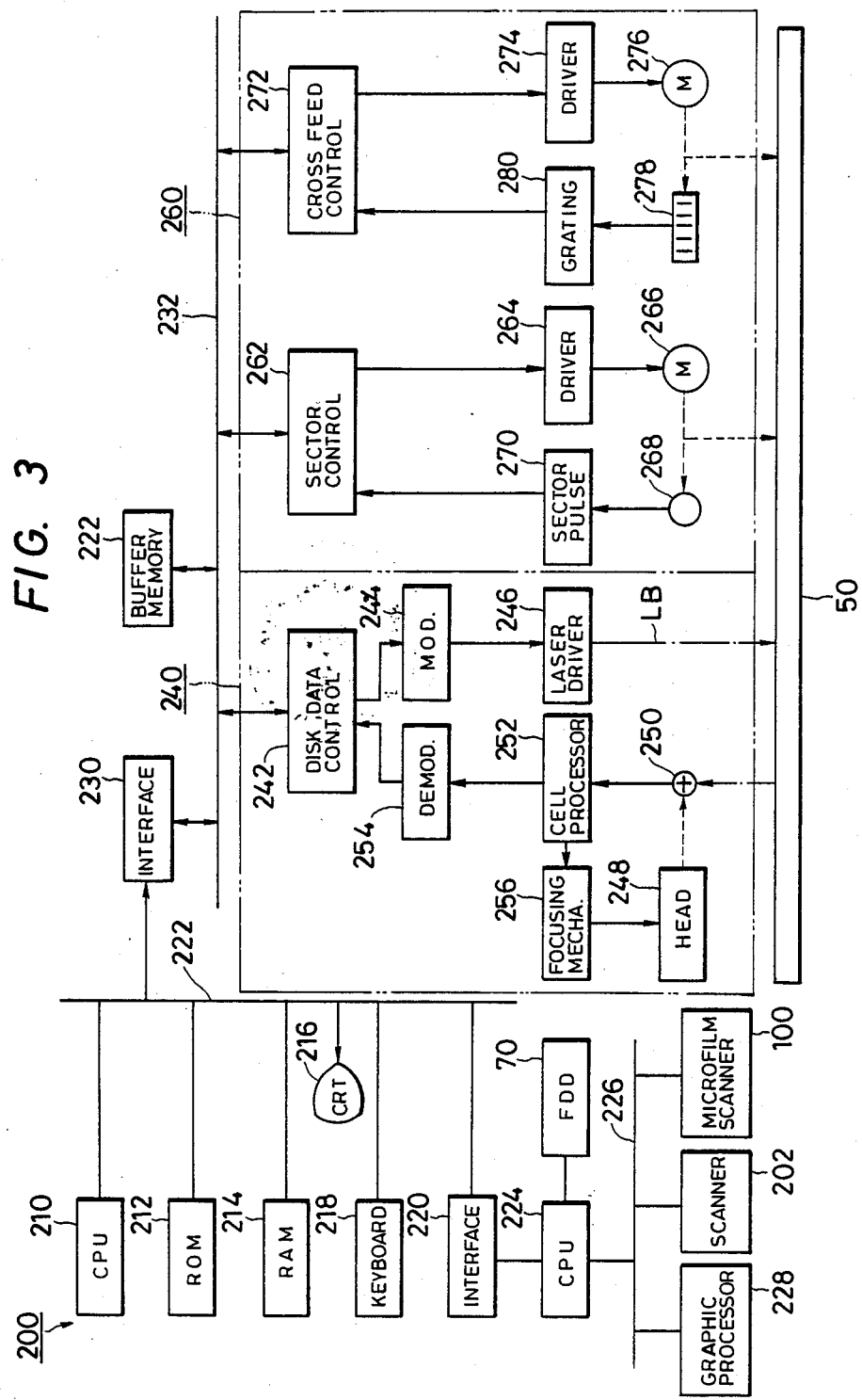
FIG. 3 is a diagram explanatory of an optical disk recorder as part of FIG. 1.
Figure 4:
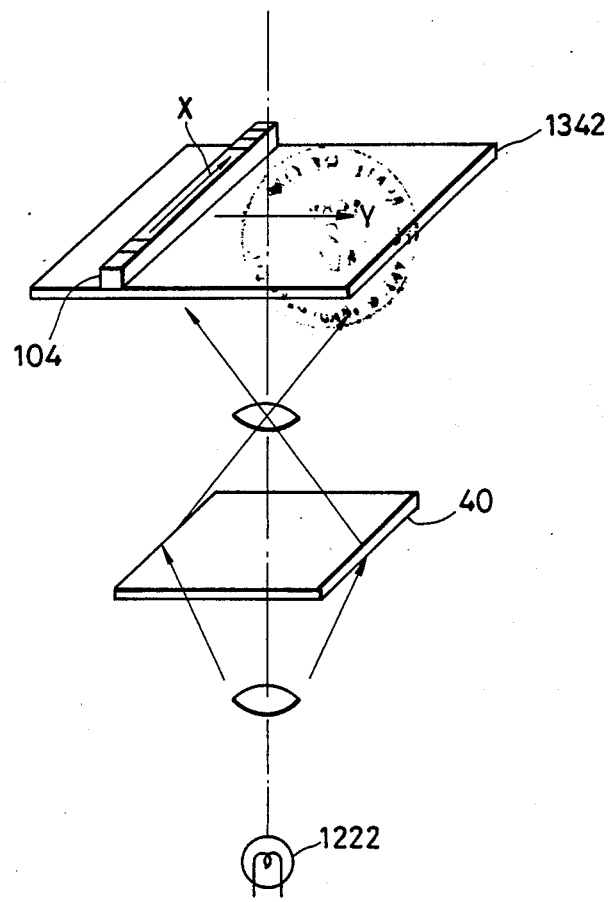
FIG. 4 is a diagram explanatory of two-dimensional scanning of an image by the image sensor.

It may be acceptable to obtain the minimum value of the output in terms of one point on one line within the scanned image plane. However, if the minimum value L is what is derived from the dust or scratch, it may not always be a proper one. Accordingly, a value at one point on each of several lines, e.g., four lines per image plane, is obtained and the mean minimum value may be set by the CPU 602 as the minimum value. It can be controlled by the control signal from the CPU 182 of the controller 180 shown in FIG. 3 which ones of the minimum value is to be held.

Moreover, the mean minimum value may be computed by the CPU 602. In this case, the CPU 602 may be equipped with a memory for taking a lower limit value obtained on a line basis, a means for computing a mean value by reading each minimum value out of the memory and other means suitable for implementing other procedures.

The minimum value thus obtained is sent to the CPU 602. In the CPU 602, the density value correspoding to the minimum value is prestored and, when the minimum value is supplied, the correspoding density value can be read out. As described below, the optimum threshold level most suitable for the density value is supplied out of the density value thus supplied to the comparator 604. It may also be so arranged that the threshold value is directly supplied out of the minimum value.

Figure 8:
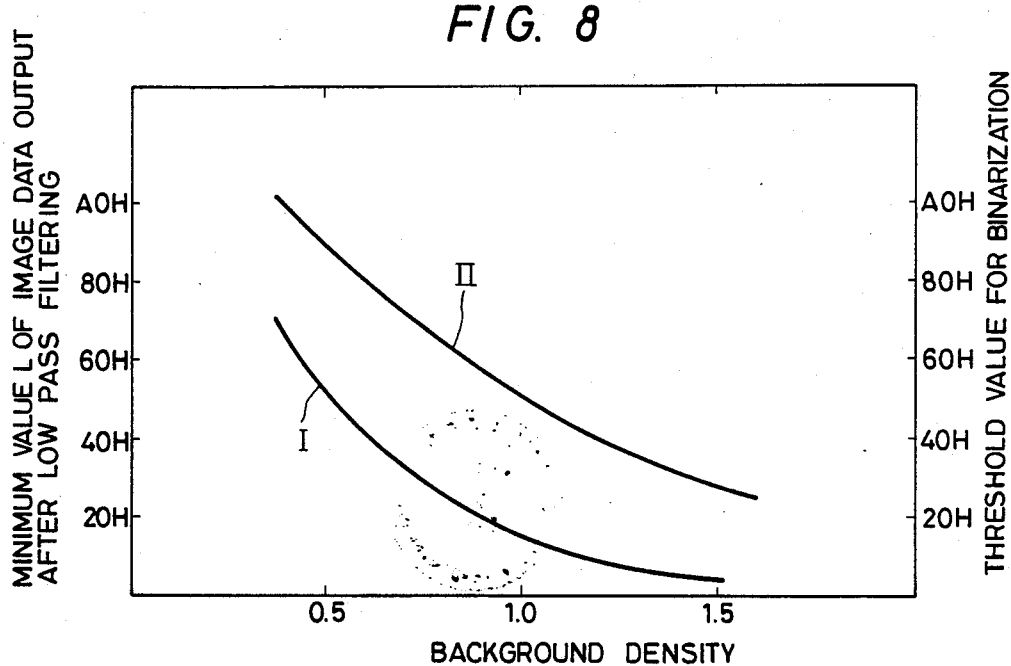
FIG. 8 is a diagram showing the relation of the film density and the minimum value of the signal passed through the low-pass filter to the binary level.

FIG. 8 is a characteristic chart showing the relation of the film background density (horizontal axis) thus obtained to the minimum value (vertical axis) of the output of the image data passed through the low-pass filter 606 (curve I) and to the threshold value for binarization as described later (curved II).

FIG. 8 shows test results assuming the output after A/D conversion in the case of a transparent test film. The vertical axis on the left-hand side of FIG. 8 represents the minimum value L (in hexadecimal notation) of the image data output after it has been passed through the low pass filter 606. A value of 1.0 for the background density on the horizontal axis is the one at which the contrast is an optimum. The greater the value, the higher the density becomes, whereas the density is lowered as the value becomes smaller.

As is obvious from the curve I, the relation of the minimum value to the film density is 1:1 and, if the relation of the minimum value to the film density is prestored in a table memory 616 of the CPU 602, e.g., a table RAM or ROM as deemed fit for the purpose, the lower limit background density value correspoding to the minimum value may be read out and made known when the minimum value thus measured is supplied to the CPU 602.

Setting Up of Threshold Value

In FIG. 8, the vertical axis on the right-hand side is represented by any given threshold value for binary digitization. FIG. 8 shows the relation of the background density to the threshold value most suitable for digitization. As is obvious from FIG. 8, the binary threshold value for obtaining an optimum image varies over a wide range when the film density is changed from, e.g., 0.5 to 1.5 or thereabout. In consequence, when it is attempted to manually set a binary value using the relation between the background density and the threshold value, the background will totally appear in the reproduced image, thus making the image black if the adjustment is slightly shifted in an area where allowance for adjusting the threshold value is narrow or data will be completely skipped. The setting of the optimum threshold value for one film is thus delicate and hard to adjust.

Therefore, as shown in FIG. 7(B), a threshold level TH is set by shifting the level to the extent that a background B only can be subtracted from the minimum density (output) value L only to freely set the binary threshold level, whereas the relation of the background to the optimum threshold value is set at 1:1 so that the data portions $A_1$ and $A_2$ in the image and the background B can be properly binary digitized.

The setting up of the threshold level is, as set forth above, carried out by prearranging a list corresponding to the minimum density values and writing the results to the table memory 616 of the CPU 602. Assuming the output of the image data is e.g., $20_H$ (H denotes hexadecimal notation), the corresponding threshold level is set at $5A_H$. In this case, the shifting quantity may be set at any given suitable one as occasions demands.

In so doing, the image data outpput i.e., the background density per film to be read out, can be measured and, by automatically setting the optimum threshold level for binary digitization, the threshold value can be supplied from the table memory 616 of the CPU 602 to the comparator 604.

With the above construction, the image data can be digitized automatically, accurately and quickly.

Although the above embodiment has been described for a negative film, the invention can be easily extended to positive films. In this case, the maximum value is held in a peak holding circuit 614 and the optimum threshold value corresponding to the maximum value is set in the table memory 616. Thereby, a binary threshold value may likewise be set automatically.

Although the circuit shown in FIG. 6 is so arranged as to effect the process using a digital signal, an analog signal may also be used. In this case, no table memory is required.

Binary Digitizing Process for Increasing Contrast of High Frequency Component When the image frequency becomes high, the above digitization process may be incapable of effecting accurate binary digitization.

Figure 9:
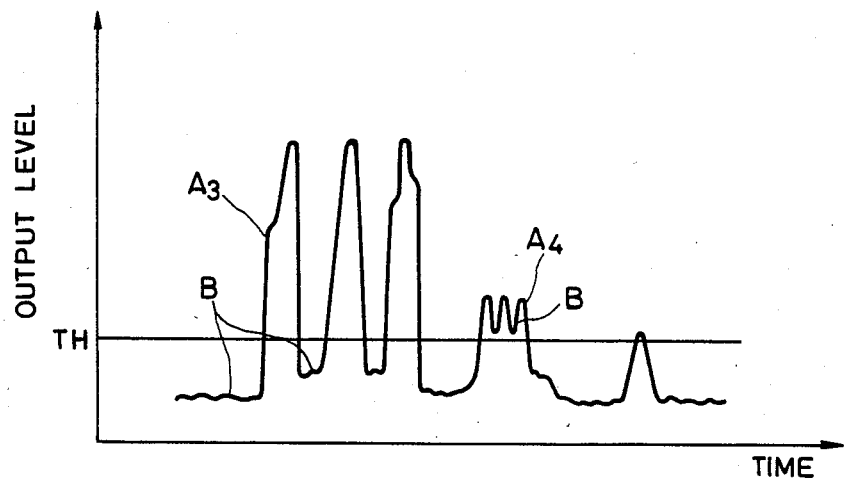
FIG. 9 is a signal waveform chart for illustrating an example of the input image data.

As the image frequency component is raised, the difference between white and black outputs is lessened and the contrast therebetween is lowered. An image data waveform with time as the horizontal axis and the output level as the vertical axis is shown in FIG. 9. There has appeared in this waveform a clear contrast between a signal $A_3$ and the background B in a low frequency area. However, the contrast between a signal $A_4$ and the background B in a high frequency area is extremely low, whereby the image is obscure. Even though the threshold level thus obtained is TH as set forth above, the image data may not be accurately digitized in the high frequency area.

Figure 10A:
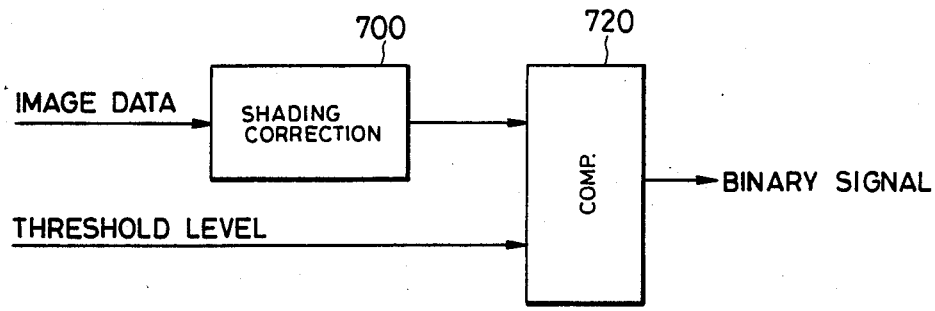
FIGS. 10(A)–10(C) are a block diagrams explanatory of three binary digitization methods so arranged as to accurately digitize the high frequency component of the image according to the present invention.
Figure 10B:
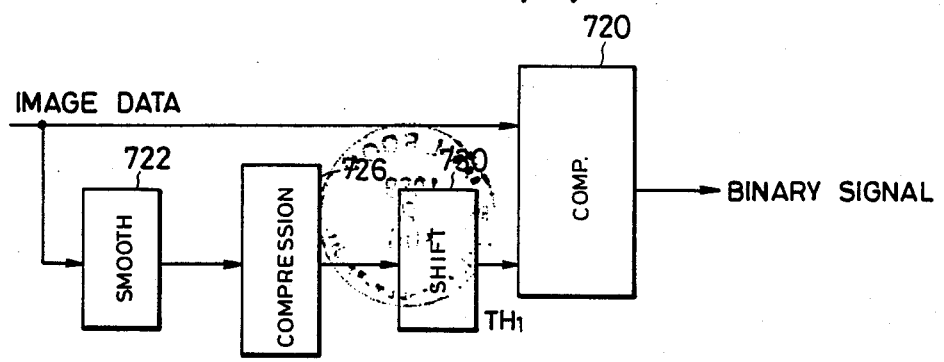
Figure 10C:
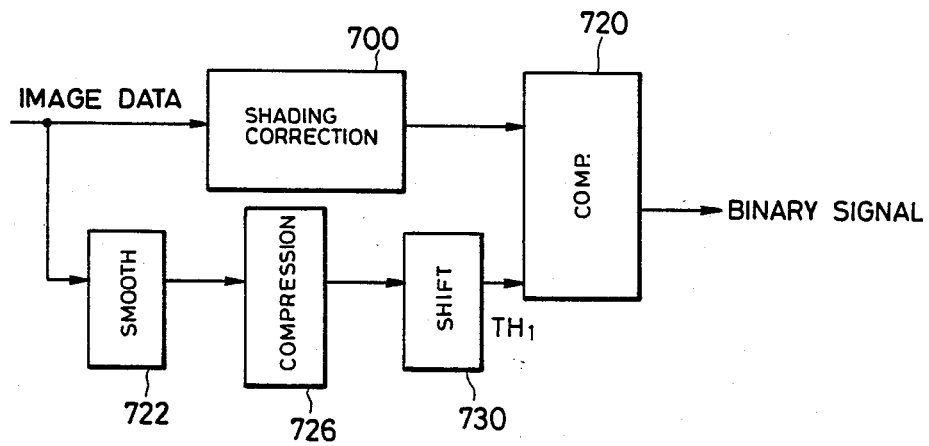

To remove the shading and effect accurate binary digitization, there are considered three techniques as shown in FIGS. 10(A)–(C).

In the first technique a shading correction circuit 700 is used to correct shaded image data. The fixed binary digitizing threshold level TH thus obtained above or any other proper threshold level is used as the threshold level with the comparator 720 for comparison.

In the second technique, as shown in FIG. 10(B), the image data as it is to be digitized is supplied to one of the input terminals of the cmparator 720. On the other hand, an optimum threshold level $TH_1$ for binary digitization is formed for the image data through a smoothing circuit 722, a compression circuit 726 and a level shifting circuit 730. The threshold level is supplied to the other input terminal of the comparator 720 to effect binary digitization.

As a third technique, the first and second technique are simultaneously carried out. The image data to be digitized is passed through the shading correction circuit 700 and the threshold level for binary digitization is obtained by supplying the image data to the comparator 720 through the smoothing circuit 722, the compression circuit 726 and the level shifting crcuit 730.

The binary digitization method by digital process will now be described. As in the above case, a description will be given of image processing relative to image data obtained by two-dimensionally scanning a projected image on a negative film with the image sensor.

1. First Method

The high frequency component should be intensified to remove shading in an image and, as a first method, it can be implemented by using a known Unsharp Mask (simply called a mask US) (Reference: Basic Optical Science on Light and Image, Association of Electrical Engineering).

Figure 11A:
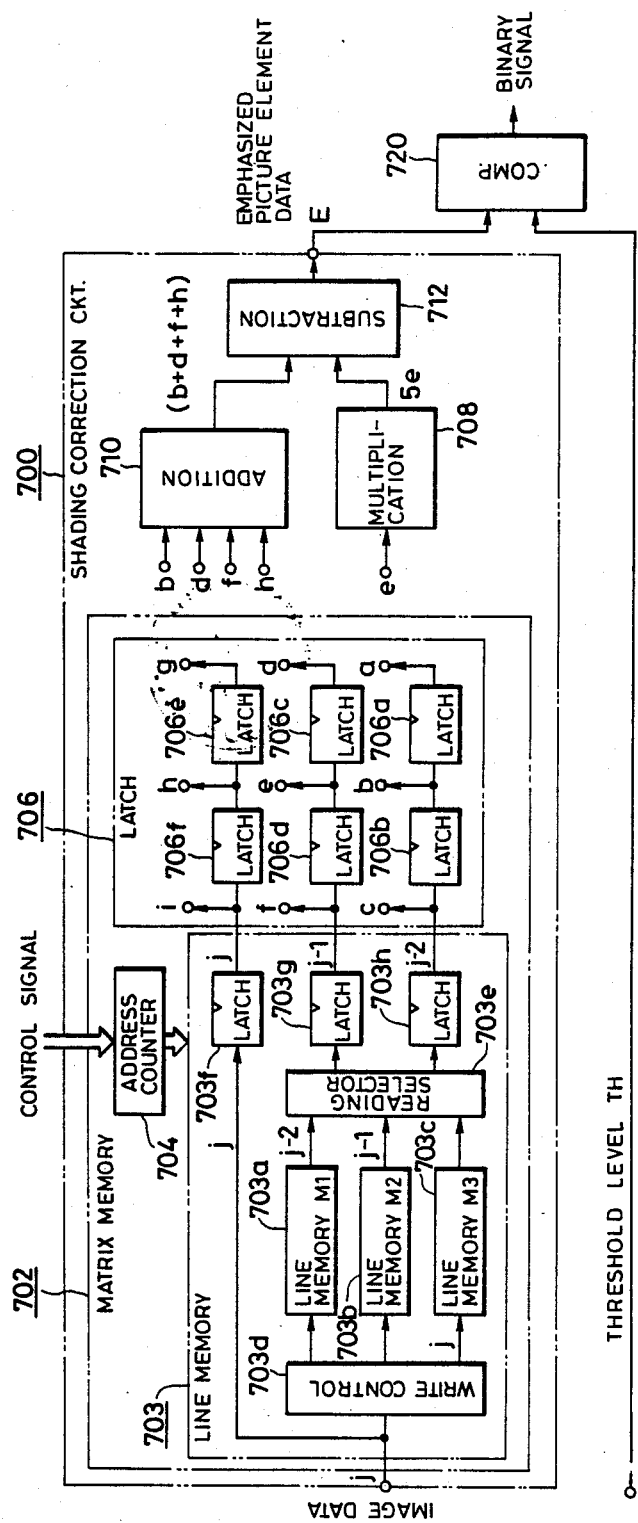

FIG. 11(A) is a block diagram of a circuit corresponding to FIG. 10(A) and shows the circuit diagram using the mask US as the shading correction circuit 700.

The mask US is designed to make the density inclination steep in view of the fact that shading in an image appears at the edges between areas having uniform density. Given the image space is an odd number matrix where central picture elements appear according to the mask US, the picture element data corresponding to the central picture elements is emphasized and outputted. For instance, the image sensor 104 has 2,048 picture elements and each line is scanned in the main direction to read out picture elements on a line basis and the data are successively stored in line memories. Assuming one picture element in one byte, the line memory is the one having 2,048 bytes. The line memories are installed in parallel and the data corresponding to 9 picture elements of a 3×3 matrix, as shown in FIG. 11(B), are simultaneously read out to emphasize the data of the central picture elements. The central picture element data of the matrix is assumed to have a value e, provided the picture element data a−i are arranged as shown in FIG. 11(B). The emphasized picture element data E corresponding to the central picture element is given by $$E = 5e - (b + d + h + f) \quad (1)$$

Accordingly, in the mask US, the picture element data corresponding to the 9 picture elements of the 3×3 matrix are read out in parallel. The emphasized output E is obtained by so arranging the picture element data as to subject them to multiplication by (5e), addition by (b+d+h+f) and subtraction of these two term, as required by Eq. (1).

In the shading correction circuit 700 of FIG. 11(A), an n×n (n being an odd number greater than 3) matrix may alternatively be used to provide the above arrangement. The arrangement of the 3×3 matrix as the mask US will be described in detail.

The matrix memory 702 is equipped with a line memory section 703, an address counter 704 for causing the picture element data to be written to and read from the line memeory section 702 on receiving a control signal from the CPU 182 of the control means 180 and a latch section 706 for outputting the 9 picture element data in parallel.

The line memory means 703 is provided with three units of line memories (M1, M2, M3 and shown by 703a, 703b, 703c), each having locations equal in number to the number of picture elements of the image sensor 104 (the number of dots on one line, e.g., 2,048 picture elements). By controlling the image data read on a line basis with a writing controller 703d, the data is written in a circulating fashion to one of the line memories 703a, 703b and 703c on a line basis. Assuming preceeding image data j−2 by two lines is written to the line memory M1 and preceeding image data j−1 by one line is written to the line memory M2 and image data j is now being written to the line memory M3 and also being used without being stored. On the other hand, of the line memories M1, M2, M3, the image data j−1 and j−2 not being currently written into the line memories are controlled by a reading selector 703e and read in parallel from two of the line memories synchronously with the writing. At this point of time data are simultaneously read out of the line memories M1 and M2 and the picture element data thus read out are sent to the latch section 706 in the next stage through latch circuits 703g and 703h. Simultaneously then, the image data j being currently written is directly sent to the latch means 706 separately through a latch circuit 703f.

The latch section 706 is equipped with latch circuits 706a, 706b, 706d, 706e and 706f in two stages for each line and is so arranged as to provide simultaneous outputs from three places. Assume that the successive three picture element data of the image data j−2 read out of the line memory M2 are a, b and c; the three successive three picture element data of the image data j−1 read out of the line memory M1 are d, e and f; and the picture element data of the image data j being written are g, h and i. The latch section 706 is adapted to simultaneously read out the picture element data a−i (9 data corresponding to the 9 picture elements of the 3×3 matrix) and cause them to be outputted in parallel.

In the line memory section 703, the latch circuits 703f–703h are installed as required in order to synchronize the timing of reading relative to the speed of reading the line memories 703a–703c but they may be omitted.

Of the picture element data a−i thus read out, the picture element data e is sent to the multiplier 703 for implementing the multiplication (5×e) of Eq. (1). On the other hand, the picture element data b, d, f and h are supplied to the adder 710 for the addition of Eq. (1). Each output thus computed in the multiplier 708 and the adder 710 is supplied to the subtractor 712, where the subtraction of Eq. (1) is carried out to obtain the emphasized picture element data E of Eq. (1). This process is applied to the image data of the shading image and the emphasized picture element data is supplied to the comparator 720 as what should be binary digitized.

As is readily understood from an image data waveform chart of FIG. 11(C) with time as horizontal axis and the output level as the vertical axis, the image data empahsized through the mask US is the output level of the (white) signal $A_5$ which is emphasized from the signal $A_4$ (FIG. 9). The signal of the background $B_1$ is lowered with the (black) background B (FIG. 9) being emphasized. As a result, the difference in contrast is sufficiently emphasized.

According to the first method, image data having an extremely fine pattern which is not binary digitized through the conventional method and may blank out as white level can be digitized with the fixed threshold level TH which is optimum for binary digitization or what is obtained in a known method accurately and properly. Thereby, the resolution is increased.

Second Method

Figure 1:
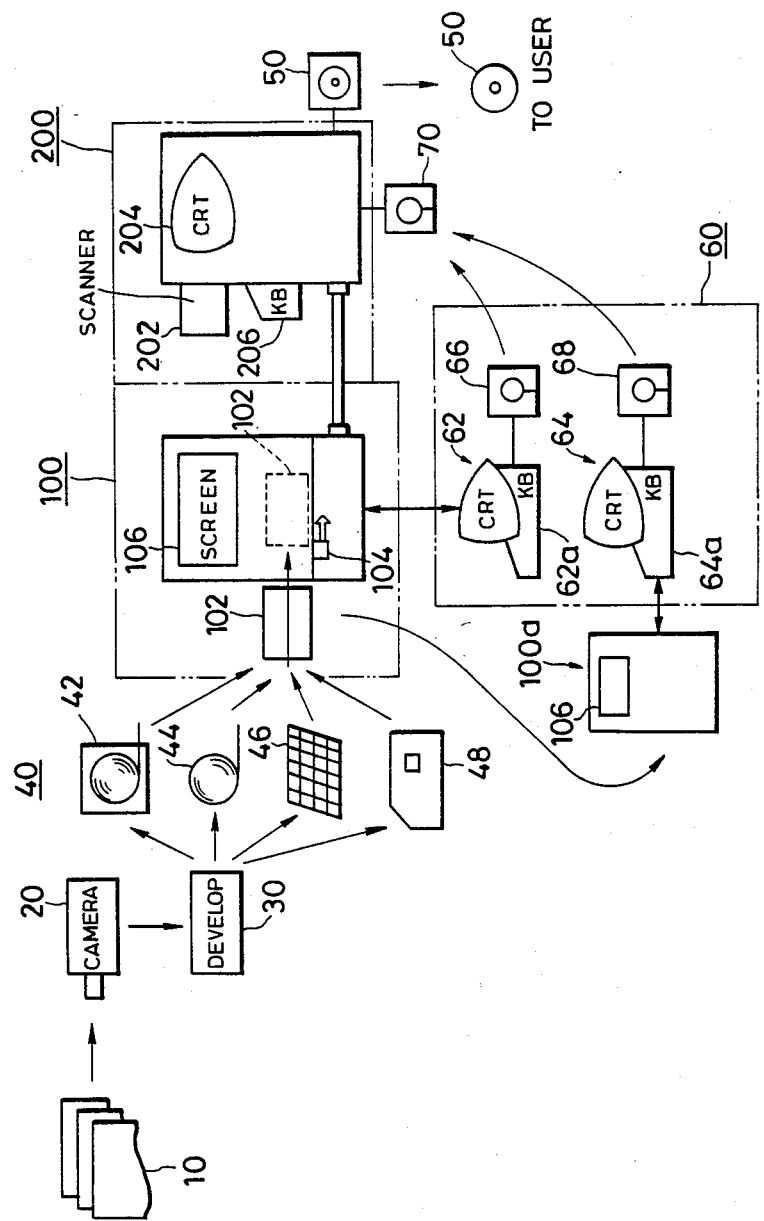
FIG. 1 is a schematic diagram showing a microfilm reader to which the present invention is applicable.

In this method, instead of directly supplying the image data having a shading image sent out of the shading correction circuit (320 of FIG. 1) to the comparator 720, the threshold level is set in a manner different from what has been described above to carry out accurate binary digitization.

Accordingly, the image data is smoothed once and compacted and, by shifting the level of the compacted signal to form the optimum threshold level for binarization of the image data involved, a reproduced image of high quality can be obtained.

Figure 12A:
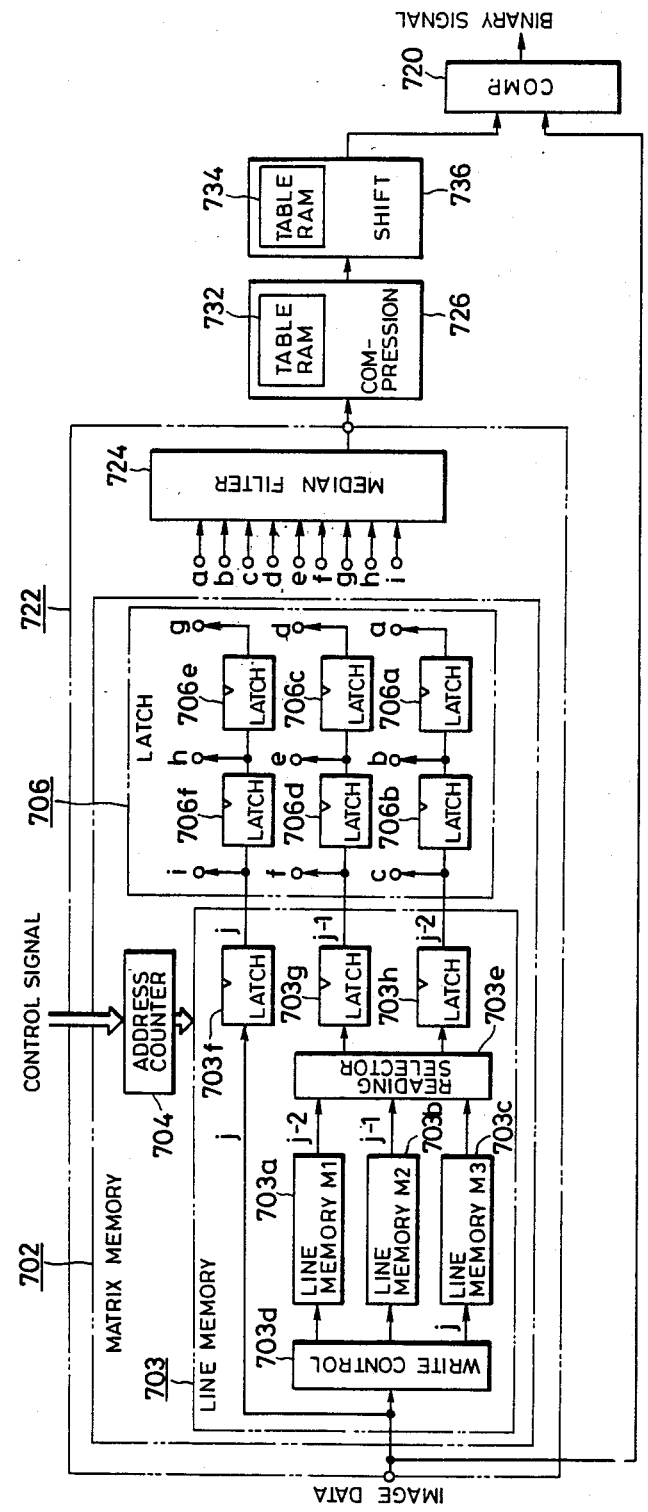
FIGS. 12(A)–12(E) are diagrams explanatory of a second digitization method of FIG. 10(B).

FIG. 12(A) is a block diagram corresponding to FIG. 10(B), wherein a known median filter 724 is used as the smoothing circuit 722. This embodiment will now be described. Since the median filter 724 is disclosed in detail by the above described reference, Basic Engineering of Light and Image, its full description will be omitted.

The median filter 724 is a low-pass filter and, as is well known, if it is arranged as an n×n, e.g., 3×3 matrix, the density values of 9 picture element data a−i are rearranged in low to high order and the fifth density value (central or mean value) from the lowest is employed as an output. Consequently, an output without shading at the edge between areas having uniform density is produced. Therefore a low-frequency signal can be smoothed. The use of the median filter 724 makes possible the acquisition of a smooth signal nullifying variations even though the background level of the image data slightly varies because of dust or variations of the image sensor.

To supply the picture element data to the median filter 724, the smoothing circuit 722 is equipped with the matrix memory section 702 including the line memory section 703, the latch section 706 and the address counter 704. The smoothing circuit 722 reads the picture element data in parallel in the same manner as what has been described in the above embodiment of (FIG. 11) of the first method. Since circuit components operate in the same way, like reference characters are given to like components and the description thereof will be omitted.

Figure 12B:
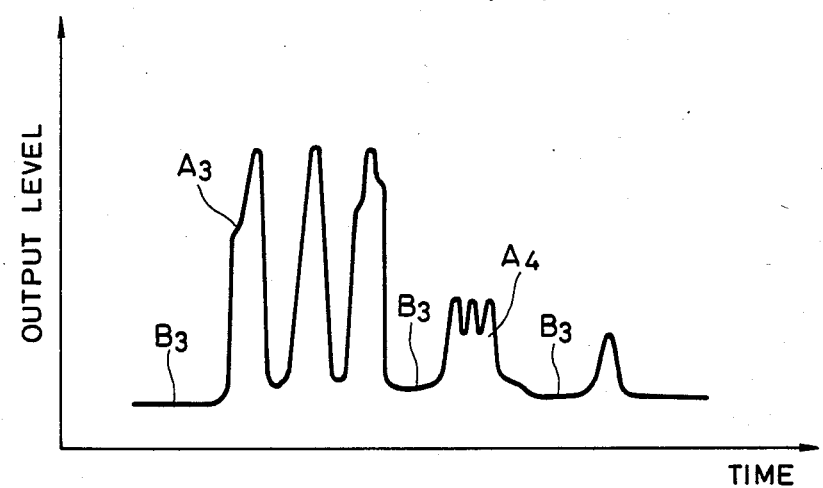

In this embodiment, also, image data j on a line is applied to the smoothing circuit 722. As in the case of the above-described embodiment, the preceeding image data j−2 by two lines and the preceeding image data j−1 by one line and the image data at present, i.e., three picture element data, are simultaneously read out in parallel and 9 picture element data are supplied in parallel to the median filter 724. The image data obtained from the median filter 724 is a signal free from background noise. FIG. 12(B) shows the image data thus smoothed with time as the horizontal axis and the output level as the vertical axis, whereas $B_3$ designates a smoothed background.

The smoothed image data is amplitude compacted in the compression circuit 726 and outputted therefrom. The level of the compacted signal is shifted by a level shifting circuit 736 up to above lower limit level (background level) to form a threshold level suitable for binary digitizing the image data having a high frequency component. The threshold level can be obtained from the image data to be digitized. The degree of compression and the quantity of shifting are set properly depending on the output level of the image data. Given the output difference between the minimum peak of the output of the image data prior to compression and the background level is 100%, the threshold level is set so that the threshold level accounts for 30-90%, preferably 80-90% relative to the minimum peak. In this case, the compacted signal thus obtained is not usable as the threshold level because the signal has the same level as that of the background and can not be distinguished from the latter.

Figure 12C:
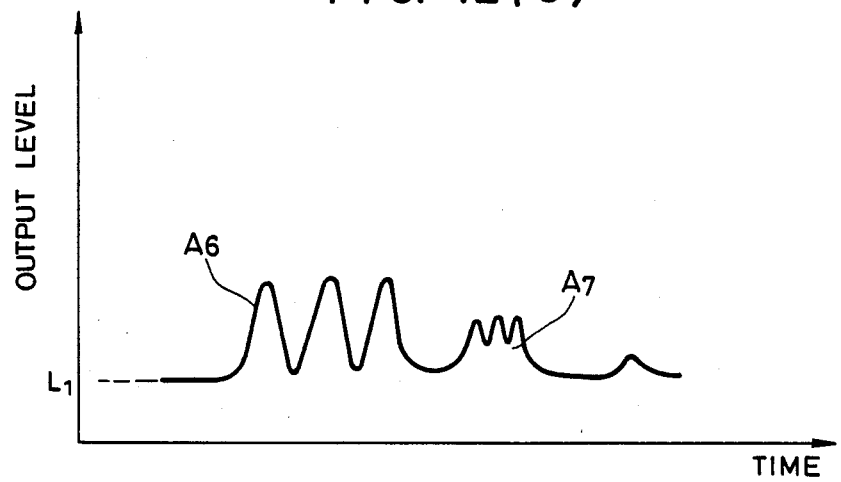
Figure 12D:
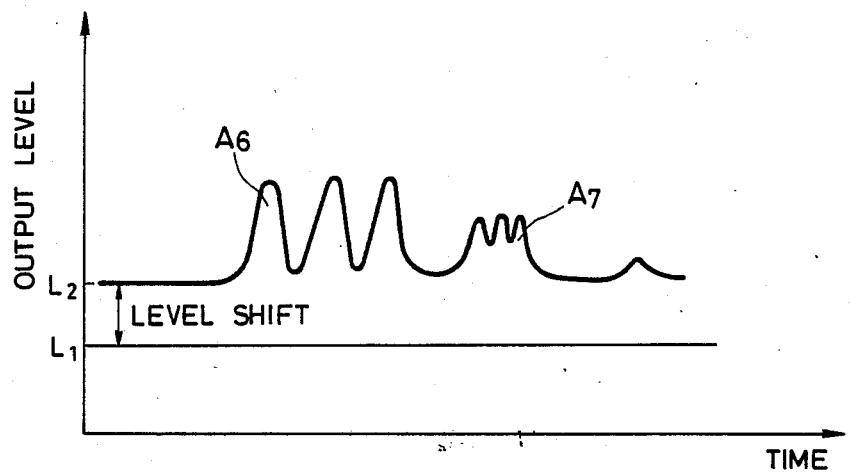

FIG. 12(C) shows a signal waveform compacted and sent out with time as the horizontal axis and the output level as the vertical axis. In FIG. 12(C), a portion $A_6$ corresponds to the signal $A_3$ of FIG. 12(B), whereas a portion $A_7$ corresponds to the signal $A_4$. $L_1$ indicates the background level. FIG. 12(D) shows a signal waveform after the level is shifted, wherein the background level $L_2$ is shifted from the level $L_1$ by a fixed shifting quantity.

Figure 12E:
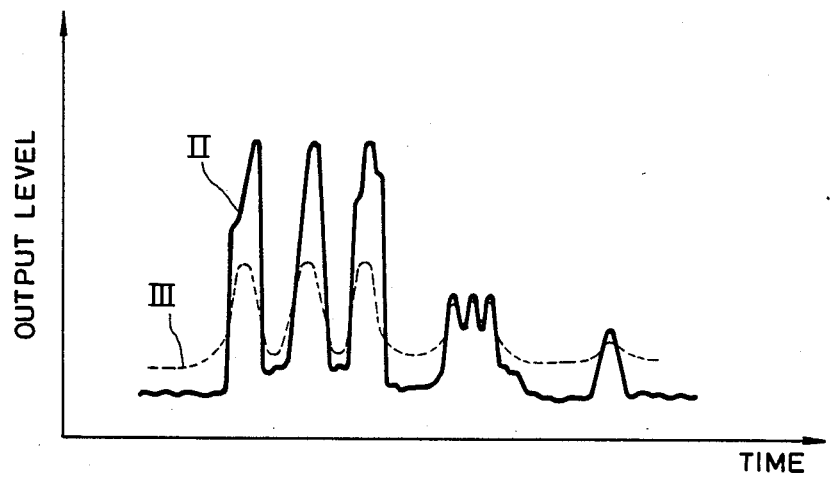

In the compression circuit 726, the image data may be multiplied by a proper coefficient to obtain a compacted signal and it is preferred that the corresonding compacted signal value levels are beforehand written to a table memory 732, of the compression circuit 726, e.g., table RAM, depending on the output of the image data to cause proper compacted signal to be produced according to the signal supplied. With respect to the quantity of shifting in the shifting circuit 730, suitable quantities are beforehand written to a table memory 734 of the shifting circuit, e.g., table RAM, depending on the output of the compacted signal and it is also preferred to cause the level to be read out according to the input level and form the threshold level $TH_1$. However the above arrangement can be modified depending on design. The memory of the CPU 182 of the controller 180 may be used as the table memory in this embodiment. The threshold level thus set up and the image data are sent to the comparator 720 to binary digitize the image data involved. FIG. 12(E) shows the realtion of the signal waveform in this case. The image data shown therein is indicated by a continuous line and the threshold level by a dashed line.

Since in this embodiment the binary threshold value is determined from the image data itself which is to be digitized, the threshold level can simply be set up even though the background of the image data fluctuates. Thereby, accurate binary digitization becomes possible.

Third Method

Figure 13A:
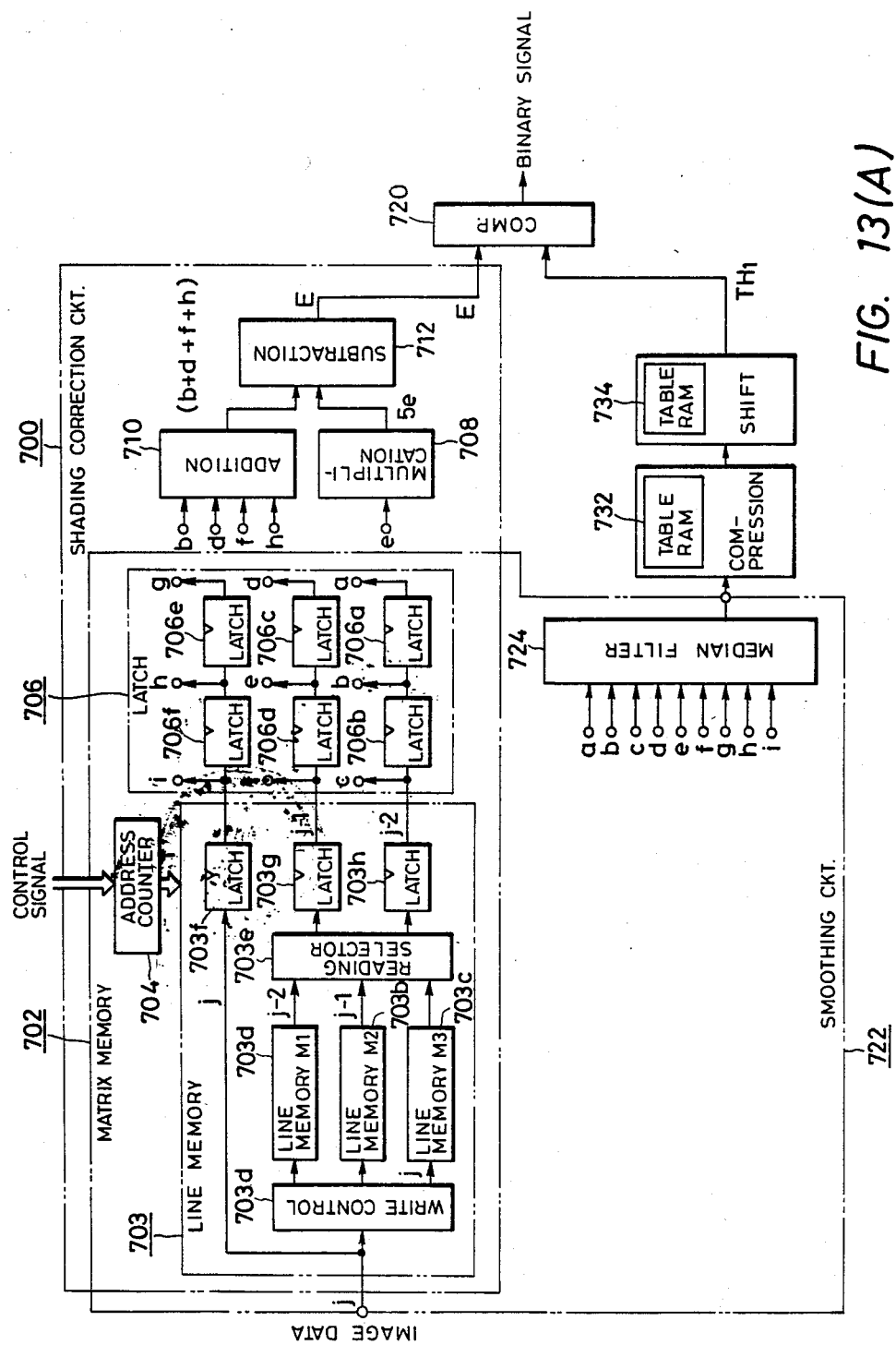
FIGS. 13 (A) and (B) are diagrams explanatory of a third digitization method of FIG. 10(C).

FIG. 13(A) is a block diagram illustrating a third image signal processing method for binary digitization according to the present invention. In this embodiment, the combination of the first and second methods is used and consequently the arrangement includes the circuit configurations shown in FIGS. 11(A) and 12(A). However, the matrix memory section 702 (including the line memory section 703, the latch section 706 and the address counter 704) which reads the picture element data in parallel is common to the shading correction circuit 700 and the smoothing circuit 722. Thereby, it is unnecessary to provide the pair of separate circuits and one unit may be used commonly.

In the third method, therefore, the image data whose waveform is binary digitized as shown in FIG. 9 is converted into a waveform (FIG. 11(C)) whose high frequency component is emphasized in the shading correction circuit 700, as in the case of the second method. On the other hand, the threshold level (FIG. 12(D)) obtained from the image data involved through the smoothing circuit 722, the compression circuit 726 and the level shifting circuit 730 is supplied to the comparator 720.

Consequently, both the signals are compared in the comparator 720 and the binary signal is thus supplied.

In the third method, the image having a fine high frequency component is further accurately digitized with high resolution.

The image data described in the first through third methods can be processed in the comparator 720, it is needless to say preferable to compute average shading correction signals or threshold levels over several line for the purpose of digitization. The comparator 720 is equipped with e.g., a means value computing circuit (not shown), which is controlled by the CPU 182 of the control means 180.

The binary signal thus obtained is output by the interface 260 (FIG.1) for the subsequent process.

The present invention if obviously not limited to the above arrangements.

Although the above-described embodiments are intended for a negative film, they are applicable to a positive one likewise by adding proper and obvious modifications thereto.

The arrangement of each circuit may also be modified suitably when it is designed. Although in the above embodiments, moreover, reference has been made to mainly a digital process, the whole or part of the circuit may be replaced with an analog process as occasion demands.

In the above-described circuit configurations, e.g., an address line, a bus and other control lines from the CPU 182 of the control means 180 have been omitted.

Although the application of the present invention to a microfilm reader has been described, the above-described embodiments are also applicable to any kind of apparatus 44 equiped with a device for producing a signal in a digital form after two-dimensionally scanning an image with an image sensor.

As set forth above, the image signal processing method according to the present invention comprises smoothing the image data obtained using the image sensor, determining the minimum or maximum value of the background from the signal thus smoothed, and determining the film density corresponding to the minimum or maximum value. As a result, the film density can be obtained with high accuracy and thus an automatic exposure control can be carried out simply and accurately.

Based on the background density thus obtained, the optimum threshold value for binary digitizatin can be set efficiently, accurately, automatically and simply as compared with the conventional binary threshold value setting method even though the background density fluctuates.

What is claimed is:

1. A signal processor comprising:

means for scanning an image having foreground and background densities and for producing output signals representing image data said signals having a value in a first range for background densities and a second range for foreground densities said first range being different from said second range;

means responsive solely to said background density image data output signals for obtaining an extremum signal value from a distribution of said image data;

means for obtaining a background density value of said image data from said extremum value;

a memory stored with a plurality of threshold values corresponding respectively to a plurality of background densities without considering foreground density;

means for reading said memory and for setting a threshold value for binary digitization in response to said obtained background density;

means for binary digitizing said image data according to said threshold value; and wherein the contrast between the foreground density and background density of the image data is low at a given frequency level, said signal processor further including a means responsive to said image data output for modifying said image data output in response to the contrast between the foreground and background of signals from said image data.

2. The signal processor as recited in claim 1 wherein said means for modifying includes a means for observing an image space comprising picture elements in an odd number matrix ($n \times n$ where $n \geq 3$).

* * * * *